United States Patent [19]

Takano et al.

[11] Patent Number: 5,001,740
[45] Date of Patent: Mar. 19, 1991

[54] METHOD AND APPARATUS FOR STARTING SWITCHING SYSTEM

[75] Inventors: Ryouji Takano, Yokohama; Takashi Hatano, Tokyo; Kiyohumi Mitsuze; Sumie Morita, both of Yokohama, all of Japan

[73] Assignee: Fujitsu Limited, Kawasaki, Japan

[21] Appl. No.: 453,423

[22] Filed: Dec. 19, 1989

[30] Foreign Application Priority Data

Dec. 20, 1988 [JP] Japan .............................. 63-319450

[51] Int. Cl.$^5$ ........................ H04M 3/22; H04M 7/06
[52] U.S. Cl. ......................................... 379/1; 379/334
[58] Field of Search ................ 379/334, 333, 230, 1; 370/56

[56] References Cited

U.S. PATENT DOCUMENTS 4,197,423  4/1980  Hutcheson et al. ............ 379/334 X
4,393,495  7/1983  Cray et al. ............................. 370/56

OTHER PUBLICATIONS

"Host Electronic Switching System Software To Support A Remote Switching System", K. Chadha et al., ICC '80, Seattle, WA, Jun. 1980, pp. 45.6.1–45.6.6.

*Primary Examiner*—Thomas W. Brown
*Attorney, Agent, or Firm*—Staas & Halsey

[57] ABSTRACT

A boot program which can independently set the signaling links with the exchange is stored in the memory of a line concentration group. Under this boot program, a signaling controller (SGC) is used to set up a signaling link from the line concentrator to the exchange. Through the signaling link, a call processing program is transferred from the exchange side to the line concentrator side, and the transferred call processing program is used to start up the line processor in the line concentration group.

18 Claims, 7 Drawing Sheets

METHOD AND APPARATUS FOR STARTING SWITCHING SYSTEM

BACKGROUND OF THE INVENTION

1. Field of the Invention

The present invention relates to a method and apparatus for starting a switching system provided with an exchange having at least a program holding unit in which various programs are held, a call processor, and a switch module controlled by the call processor and with a line concentration group provided between it and a plurality of subscribers' telephone sets accommodated in the exchange, the line concentration group including a line concentrator and a line processor which controls the line concentrator based on a call processing program.

2. Description of the Related Art

As a form of a general switching system, there is one which includes a line concentrator inserted between a switch module and subscribers' telephone sets. An exchange is formed by the switch module together with a call a processor which controls the switch module. A line concentration group is formed with a line processor which controls a line concentrator. Therefore, the exchange and line concentration group operate independently based on their own unique call processing programs.

To start up (set up) such a switching system, it is necessary to start up not only the exchange, but also the line concentration group. The present invention refers to the starting up of the latter line concentration group in particular among the two.

Taking a look at the start up (set up) of a general switching system, as explained in detail later, the starting up at a main office including the exchange is achieved by performing an initial program load (IPL) from, for example, the magnetic tape (MT) of a program holding unit through a common bus to a main memory of the call processor.

However, in a remote office including the line concentration group, located outside of the main office, such an IPL operation cannot be performed for the startup. The reason is that the remote office generally is not provided with the above-mentioned MT, etc. due to efforts to reduce costs, achieve greater compactness, etc.

Therefore, particularly when performing the startup of the line concentration group in a remote office, the general practice has been to manually bring in from the main office the read only memory (ROM) in which the predetermined call processing program has been loaded and insert the ROM into the proper device for IPL.

This form of IPL, however, requires manual work and numerous work hours. The more the number of remote offices, further, the greater the costs of the parts. This problem becomes more serious the greater the number of remote offices and the further they are from the main office. Because the starting up spoken of here includes not only the very first starting up of the system, but also starting up after shutdown due to abnormal operation in the remote offices, so the number of startups is large.

SUMMARY OF THE INVENTION

The present invention, therefore, has as an object the provision of a method and apparatus for starting up a switching system by which the starting up of the line concentration group can be performed almost without any manual intervention and can be performed almost without any modifications to the hardware.

Note that the present invention may be applied not only to the line concentration groups of remote offices, but also the practical line concentration group in the main office. However, the merits of the present invention are greatest in the starting up in remote offices.

To attain the above object, when initially starting up the line concentration group, a call processing program used by the line processor is received from a program holding unit on the main office side via a signaling link set based on a boot program. This causes the line concentration group to start the inherent call processing. Note that the above-mentioned call processing program operates in the main memory of the processor, the same as in the prior art.

BRIEF DESCRIPTION OF THE DRAWINGS

The objects and features of the present invention will be more apparent from the following description of the preferred embodiments with reference to the accompanying drawings, wherein.

DESCRIPTION OF THE PREFERRED EMBODIMENTS

Before describing the embodiments of the present invention, the related art and the disadvantages therein will be described with reference to the related figures.

Figure 1:
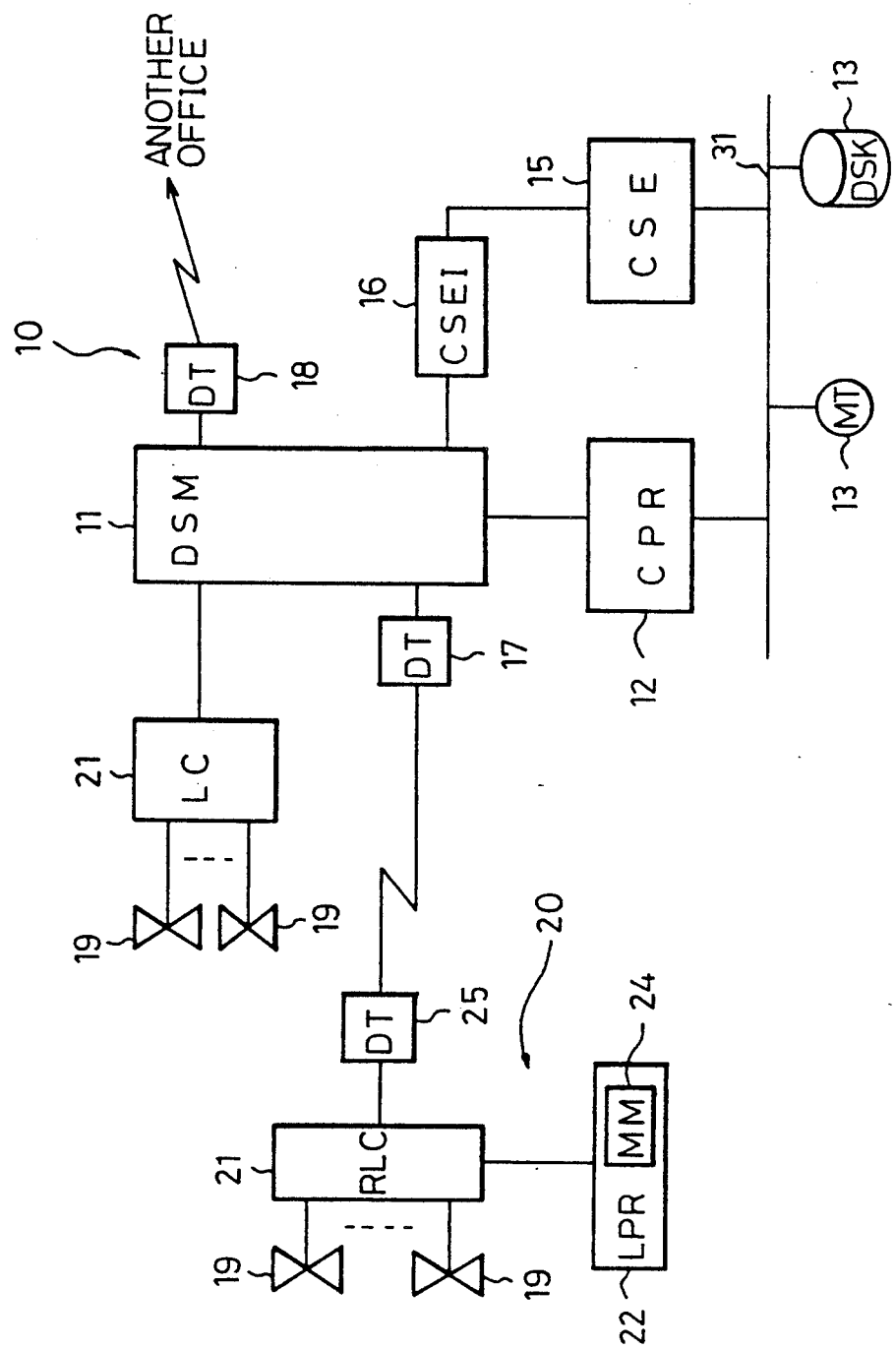
FIG. 1 is a view of a concrete example of a general switching system assumed by the present invention.

FIG. 1 is a view of a concrete example of a general switching system assumed by the present invention. In the figure, the constituent elements, already mentioned, are a digital switch module (DSM) 11 and call processor (CPR) 12 making up the exchange 10, a remote line concentrator, or just line concentrator (RLC, LC) 21, and line processor (LPR) making up the line concentration group 20. The exchange 10 has further a program holding unit (magnetic tape MT, disk DSK, etc.) 13 for holding various program, which holds at least the call processing programs for driving the call processor (CP) 12. The program corresponding to the call processing program is held also in the main memory (MM) 24 in the line processor 22.

Connection between subscribers 19 and a subscriber in another office is generally performed with the control for switching by the common channel signaling method designed in conformity with CCITT No. 7. Further, recently there has been much use of the packet communication method. The present invention may be applied to either of these methods, but the following explanation is made taking the example of the common channel signaling method, which is currently the most common.

Under the common channel signaling method, use is made of common signaling equipment (CSE) 15 and an interface of the same (CSEI) 16 to control the digital switch module (DSM) 11 and set up the path between subscribers 19. In this case, the path with the outside of the main office is set up through digital terminals (DT) 17, 18, and 25.

However, looking at the line concentrators (RLC, LC) 21, there are cases where they are set up in the same area as the main office (range shown by 10 in the figure) (the line concentrator 21 in this case being shown by simply "LC" and not being accompanied with the afore-mentioned DTs) and cases where they are set up in remote offices (range shown by 20 in the figure) (the line concentrator 21 in this case being shown by "RLC", with "R" meaning "remote") at a remote location. Note that both the LC and RLC are basically constructed by the same architecture and differ only on the point that the interfaces are handled by independent hardware due to the difference in distance from the main office.

The above-mentioned general switching system, however, suffers from the problems mentioned above. Therefore, the present invention provides a method and apparatus for starting a switching system by which the starting up of the line concentration group can be performed almost without any manual intervention and can be performed almost without any modifications to the hardware.

Figure 2:
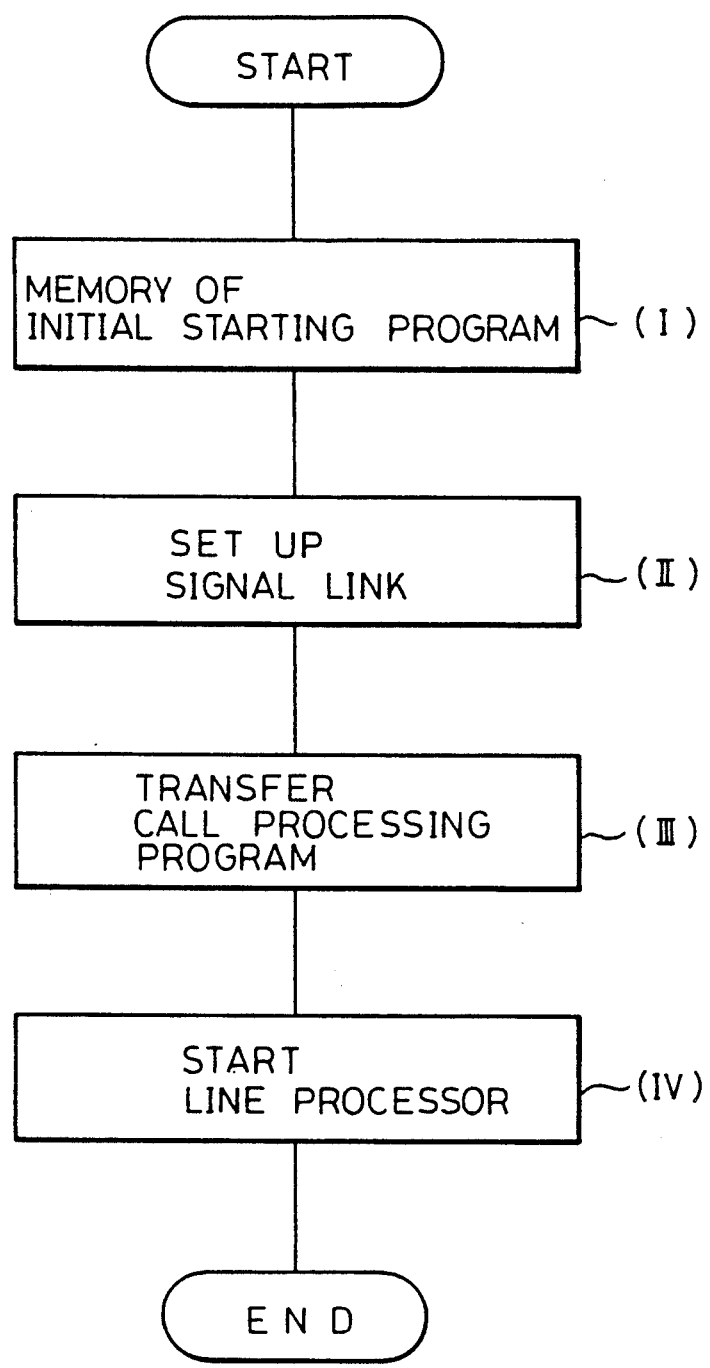
FIG. 2 is a flow chart of the starting method according to the present invention.

FIG. 2 is a flow chart of the starting method according to the present invention. The flow chart of the figure will be explained with reference to the corresponding figure references.

(I) A boot program which can independently set signaling links with the exchange 10 (FIG. 1) is memorized in the line concentration group 20 (FIG. 1), (II) Under the boot program, a signaling link is set up from the line concentration group 20 to the exchange 10, (III) A call processing program is transferred through the set up signaling link from the exchange 10 side to the line concentration group 20 side and (IV) Under the transferred call processing program, the line processor 22 (FIG. 1) is started up.

Figure 3:
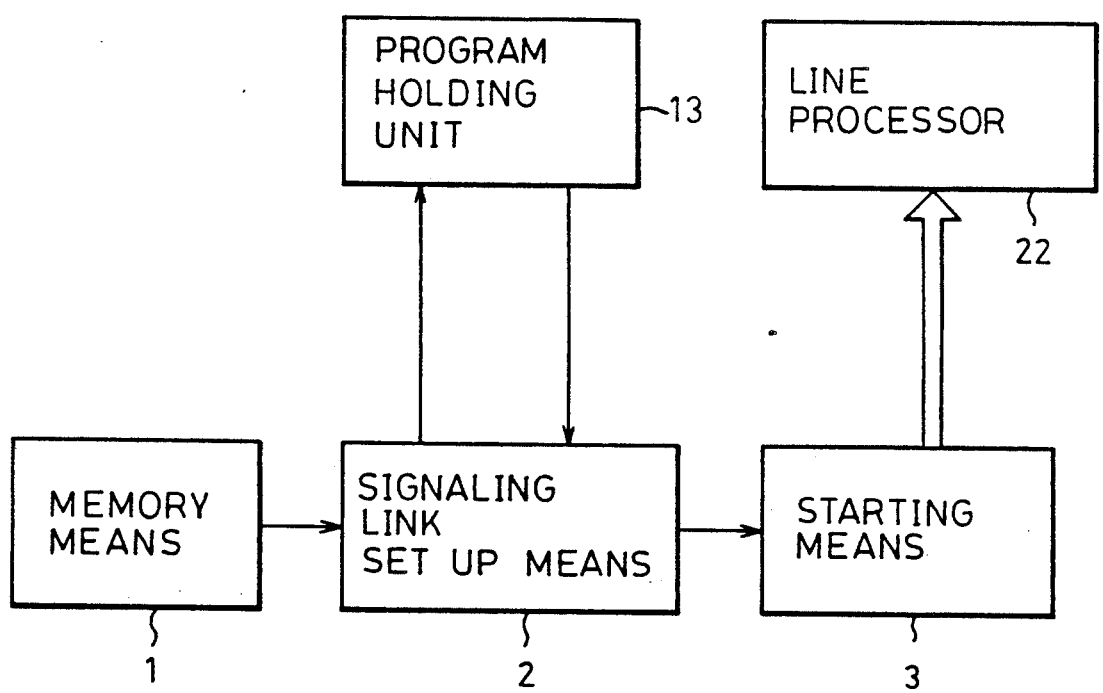
FIG. 3 is a block diagram of a starting apparatus according to the present invention.
Figure 4:
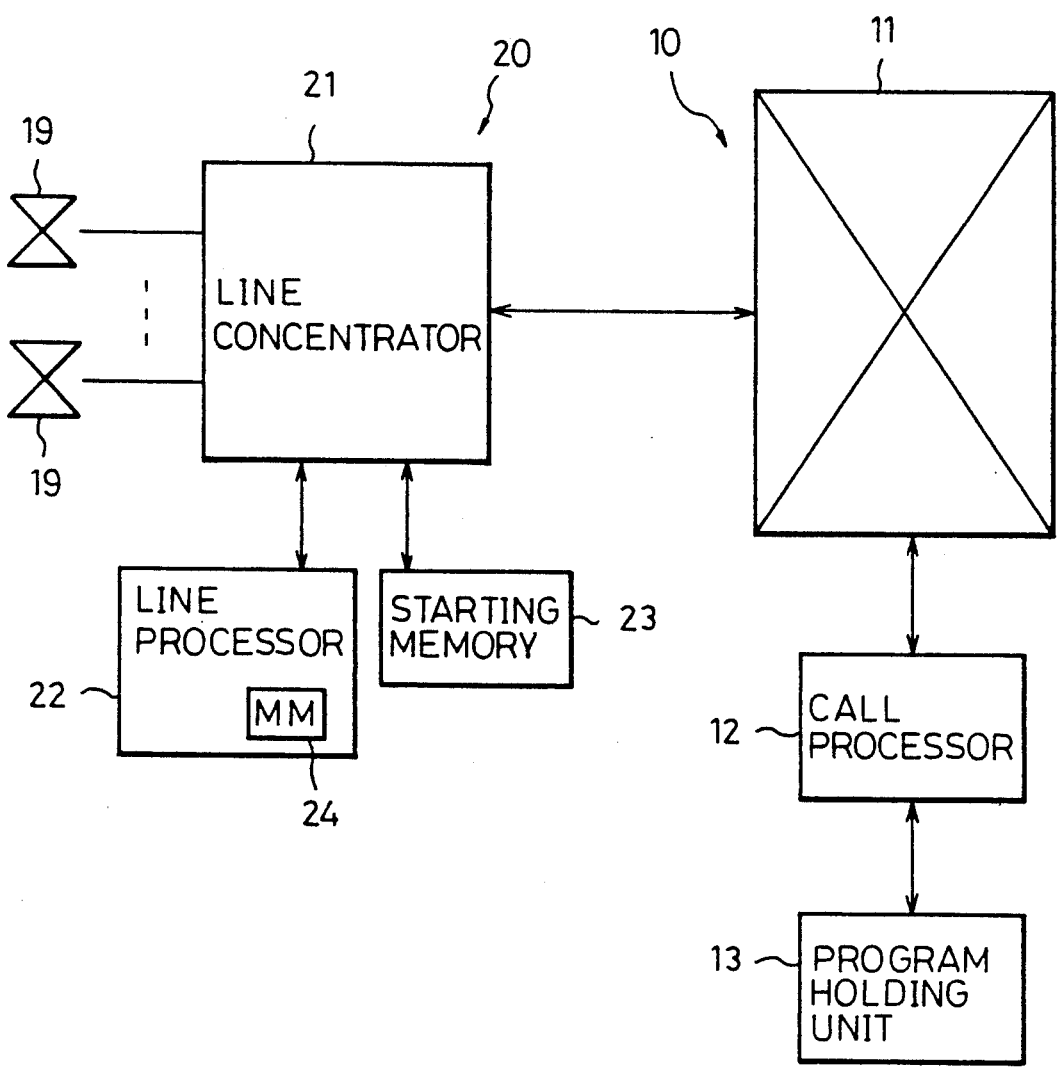
FIG. 4 is a view of a switching system including a starting apparatus according to the present invention.

FIG. 3 is a block diagram of a starting apparatus according to the present invention. FIG. 4 is a view of a switching system including a starting apparatus according to the present invention. Referring first to FIG. 3, the starting apparatus according to the present invention has a memory means 1 which is provided in the line processor 22 and which holds the boot programs which can independently set signaling links with the program holding unit 13. A signaling link setup means 2 sets the signaling link based on the boot program in the memory means 1. A starting means 3 receives the call processing program from the program holding unit 13 through the set up signaling link and starts up the line processor 22.

Referring to FIG. 4, the memory means 1 of FIG. 3 is realized by a starting memory 23. Further, the signaling link setup means 2 and the starting means 3 of FIG. 3 are both formed by the line processor (containing the main memory (MM) 24) 22. The starting memory 23 is preferably a programmable ROM. Note that if there is already an identical ROM in the line concentration group 20, use may be made of the same. This starting memory 23 holds in it the boot program (which differs from the call processing program for ordinary operation of the line concentration group) by which the line concentration group can independently set the signaling links with the exchange 10.

Returning again to the flow chart of FIG. 2, a more detailed explanation will be made of the starting method of the present invention. Between step (I) and step (II) of FIG. 2 there is included a step of loading the boot program memorized at step (I) into the main memory 24 of the line processor 22. This is to start up the line processor 22.

The setting of the signaling link at step (II) of FIG. 2 is performed based on the common channel signaling method according to CCITT No. 7 or the packet communication system. Preferably, the setting of the signaling link at step (II) is performed based on the simplified common channel signaling method, which has the same protocol as the common channel signaling method according to Consultative Committee for International Telegraph and Telephone (CCITT) method No. 7, but is more simplified in trouble treatment. This simplified common channel signaling method has as its object just downloading the call processing program through a signaling link set up based on the No. 7 common channel signaling method. Therefore, a retry is made for trouble treatment when trouble occurs, but if the trouble is not eliminated by this retry, the top of the downloading sequence is immediately returned to. This is meant to simplify the trouble treatment. This is effective for reducing the memory capacity of the starting memory 23 as much as possible.

The simplified common channel signaling method is given the same protocol as the No. 7 common channel signaling method so as to achieve compatibility with the common signaling equipment (CSE) in the exchange 10.

Figure 5:
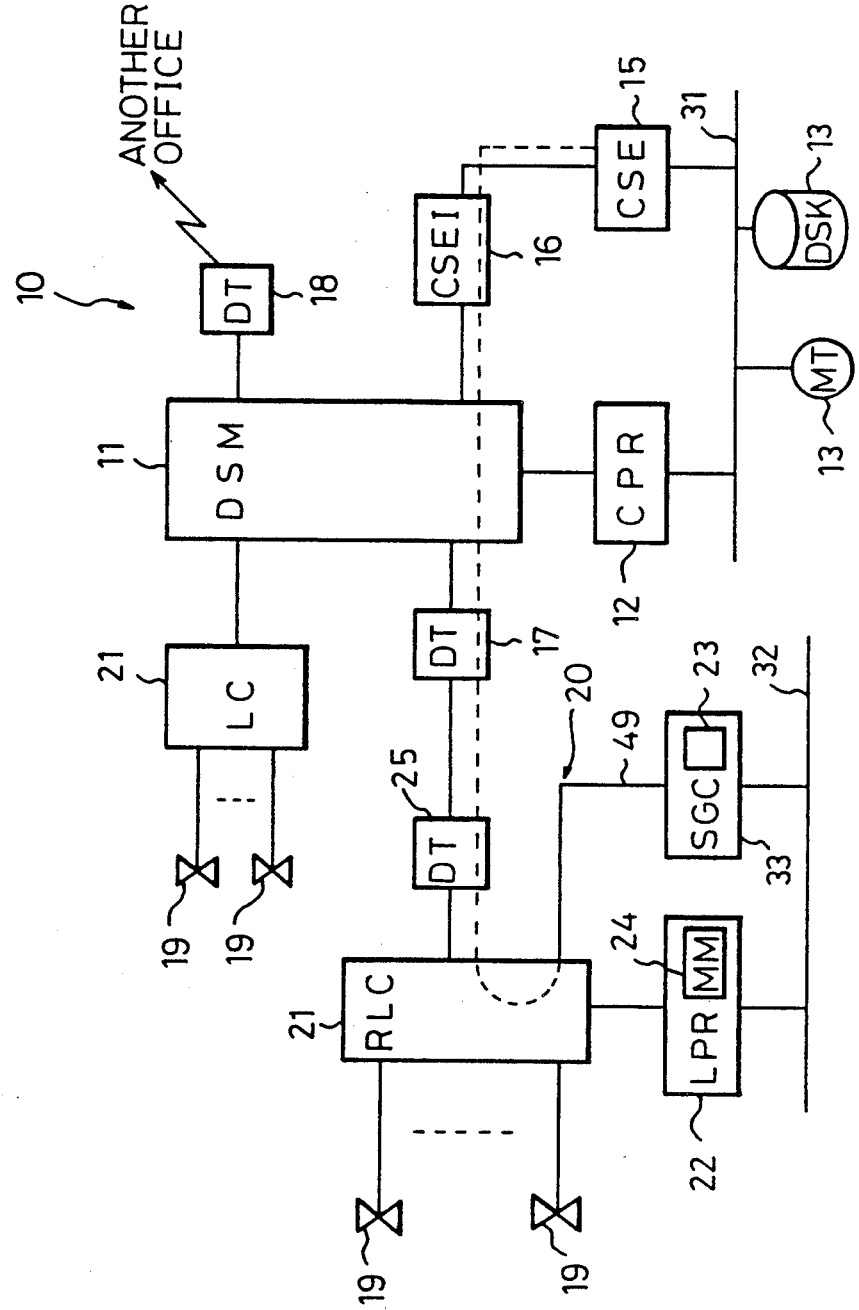
FIG. 5 is a view of a switching system according to the present invention.

FIG. 5 is a view of a switching system according to the present invention. In the figure, the starting memory 23 is accommodated in a signaling controller (SGC) 33, and the SGC 33 and line processor (LPR) 22 are connected by a common bus 32. If there is an IPL request at the remote office, that is, the line concentrator 20, the microprogram in the processor 22 has a boot program (previously mentioned boot program) transferred from the starting memory 23 in the SGC 33 connected via the common bus 32 to the main memory 24 in the processor 22. Note that the starting of an IPL in this case is performed by depressing the IPL key when there is someone in the remote office and by an alarm occurring in the processor 22 and performing the same function as depression of the IPL key when there is no one there. This boot program specifies the line switch forming the line concentrator 21 by this boot program and specifies the signaling link (dotted line in the figure) among the SGC 33→line switch→ DT25→DT17→switch module (DSM) 11→CSEI 16→CSE 15. Then, the link is started up under the common channel signaling method. The SGC 33 performs processing by the common channel signaling method in the same way as the CSE 15 on the main office (10) side under control of the processor (LPR) 22. By use of the signaling link started up here, the call processing program in the processor (LPR) 22 is received as data from the program holding unit 13 (for example, the disk DSK) on the main office 10 side. When the store operation has been completed, the control right is transferred to the currently stored call processing program and the original call processing is started. Note that the signaling link is not limited to one link and may be a plurality of links. If a plurality, the serial transfer time of the call processing program can be shortened.

Figure 6:
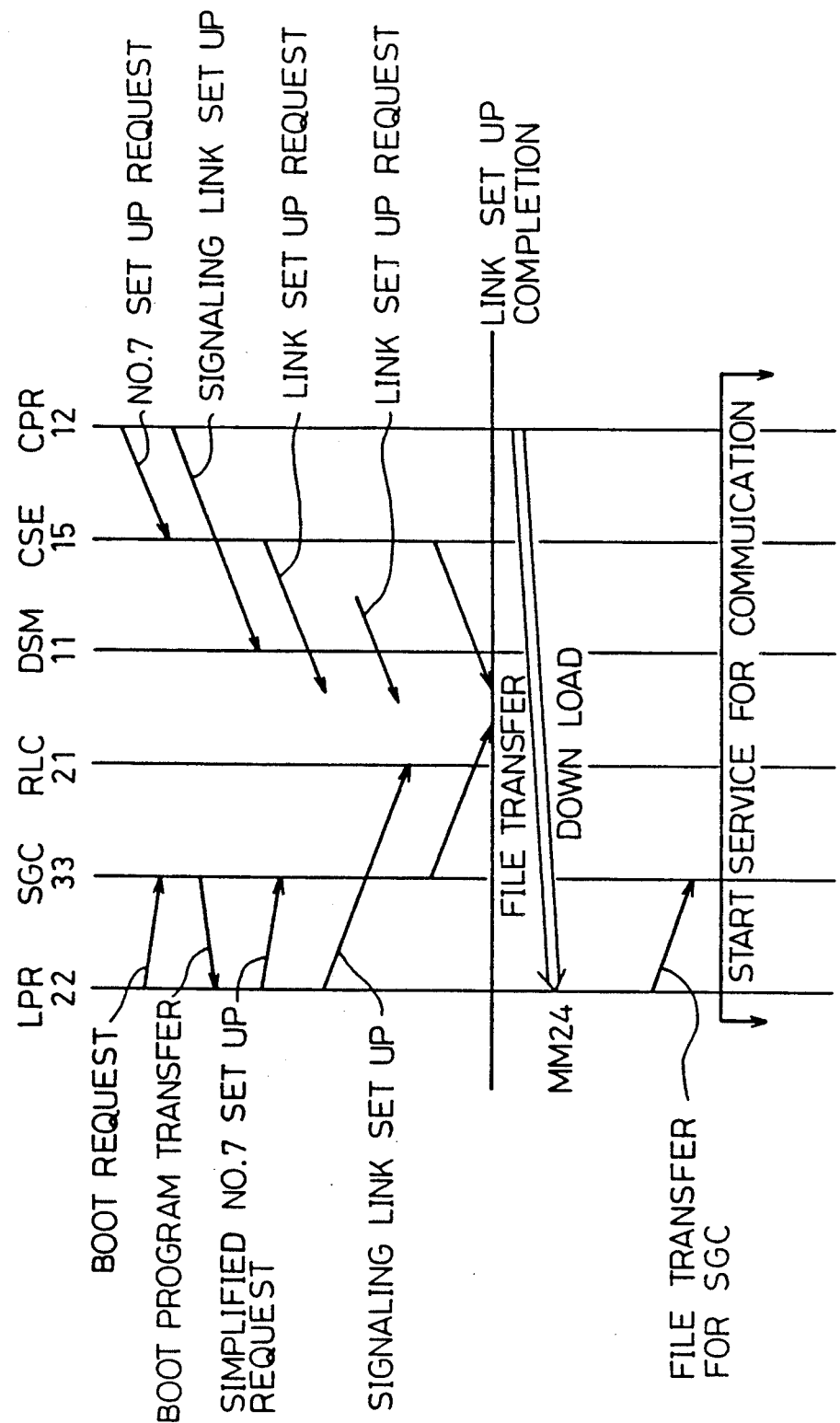
FIG. 6 is a view of an example of the starting sequence executed according to the present invention.

FIG. 6 is a view of an example of the starting sequence executed according to the present invention. In the figure, the vertical lines indicate the borderline areas of the constituent elements. The call processor (CPR) 12 performs the series of operations of outputting a setup request (No. 7 set up) of the common channel signaling method, setting up a signaling link, and making a link setup request at all times. That is, it conducts polling.

As opposed to this, in the remote line concentration group 20, when the need for a new startup occurs, a boot request is made to be issued. This request is transferred once to the SGC 33, which SGC 33 supplies the afore-mentioned boot program to the processor 22. By this, the link setup request based on the simplified common channel signaling method (No. 7) is transferred from the processor 22 to the SGC 33 and the signaling link is established. When the setting of the signaling link and the link setup request from the processor (CPR) 12, mentioned previously, match, the setup of the signaling link is completed for the first time. Through this signaling link, the call processing program which should be used by the processor 22 is down loaded from the main office (CPR) side. That is, a file is transferred. This is transferred to the main memory 24 in the processor 24 (LPR) 22. Further, at this time, the file for the SGC 33 is also transferred. This is so as to perform the setup of the signaling link by the original common channel signaling method. As opposed to this, the setting of the signaling link by the afore-mentioned boot program is the setting of a signaling link under the simplified common channel signaling method. After this, the original call processing service is started.

Figure 7:
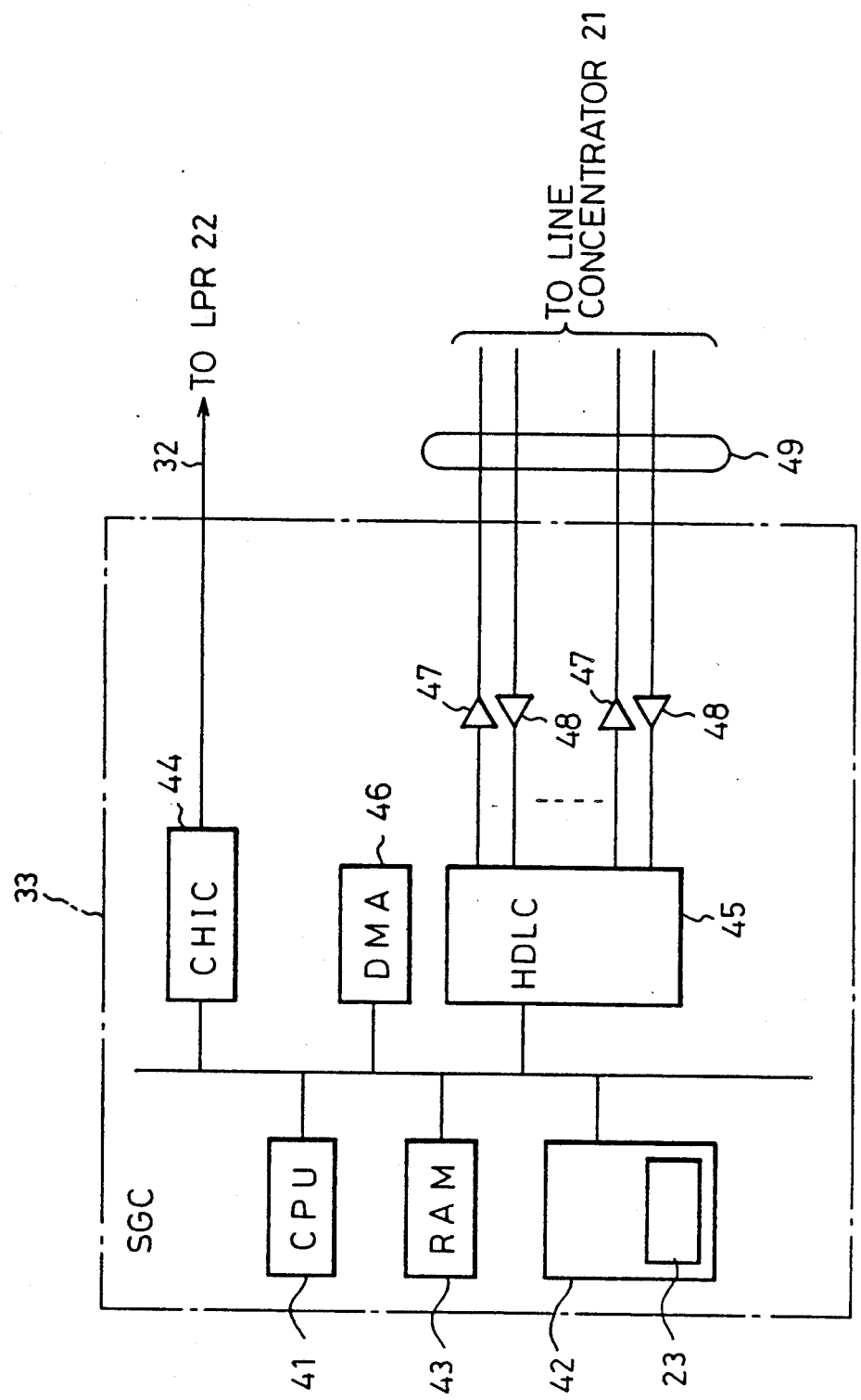
FIG. 7 is a view of an example of a signaling controller.

FIG. 7 is a view of an example of a signaling controller. As shown in FIG. 5, a signaling controller (SGC) 33 which accommodates the starting memory 23 is provided in the above-mentioned line concentration group 20. The signaling controller (SGC) 33, on the one hand, is connected with the line processor 22 through the common bus 32 and, on the other hand, is connected to the line concentrator 21 through a line 49. The signaling controller (SGC) 33, as shown in FIG. 7, includes a central processing unit (CPU) 41, signaling read only memory (ROM) 42, random access memory (RAM) 43, channel interface controller (CHIC) 44, high level data link controller (HDLC) 45, direct memory access (DMA) controller 46, drivers 47, receivers 48, and circuit lines 49. Note that the other constituent elements have already been explained. Giving a more detailed explanation, the signaling controller 33 has at least the signaling read only memory (ROM) 42 which provides a part of the memory area as the starting memory 23 and holds the programs, the central processing unit (CPU) 41 which acts cooperatively with the signaling ROM, and the random access memory (RAM) 43 which acts cooperatively with the CPU 41 and holds the data. Looking at the correspondence with FIG. 3, the signaling link setup means 2 of FIG. 3 is constituted by the CPU 41, signaling ROM 42, and RAM 43. The signaling link setup means 2 loads the boot program held in the starting memory 23 through the common bus 32 to the main memory (MM) 24 of the line processor 22.

On the other hand, the starting means 3 of FIG. 3 is constituted by the line processor 22 and the main memory 24.

Further, in the memory means 1 of FIG. 3 is held a program for executing the common channel signaling method based on the CCITT No. 7, the simplified common channel signaling method, or packet communication method as the boot program.

The signaling link setup means 2 of FIG. 3 sets up a signal linking to the program holding unit 13 of FIG. 5 through the line concentrator 21, digital terminals (DT) 25, 17, switch module 11, common signaling equipment interface (CSEI) 16, and common signaling equipment (CSE) 15.

As explained above, according to the present invention, the downloading of the call processing program from the main office to the remote offices can be performed automatically using almost as is the existing hardware and protocols, eliminating the need for refreshing, etc. of call processing programs by human operators as in the past. Further, the refreshing operations, etc. can be completed in an extremely short time. Note that the above-mentioned explanation was made mostly based on the example of compliance with the CCITT No. 7, but that if under the packet communication method, one may replace the startup of the simplified No. 7 method of FIG. 6 with the procedure of CCITT X.75, and also one may introduce, at the CPR 12 of FIG. 6, the X.75 procedure instead of the No. 7 startup.

We claim:

1. A method for starting a switching system including an exchange, having at least a program holding unit in which various programs are held, a call processor, and a switch module controlled by the call processor, and a line concentration group provided between the exchange and a plurality of subscriber telephone sets accommodated in the exchange, the line concentration group including a line concentrator and a line processor which controls the line concentrator based on a call processing program, said method comprising the steps of:
    (I) storing in the line concentration group a boot program which can independently set signaling links with the exchange,
    (II) setting up, under the boot program, a signaling link from the line concentration group to the exchange,
    (III) transferring a call processing program through the signaling link set up in step (II) from the exchange to the line concentration group, and
    (IV) starting up the line processor in the line connection group under control of the call processing program transferred in step (III).

2. A method as set forth in claim 1, including the step of (V) loading the boot program stored in step (I) into a main memory in the line processor after executing step (I) and before executing step (II).

3. A method as set forth in claim 1, wherein said setting up of the signaling link in step (II) is performed under at least one of a common channel signaling method based on Consultative Committee for International Telegraph and Telephone (CCITT) method number 7 and a packet communication method.

4. A method as set forth in claim 1, wherein said setting up of the signaling link in step (II) is performed under a simplified common channel signaling method having a protocol based on Consultative Committee for International Telegraph and Telephone (CCITT) method number 7.

5. An apparatus for starting a switching system, comprising:
an exchange, including
  a program holding unit storing programs,
  a call processor operatively connected to said program holding unit, and
  a switch module operatively connected to said call processor and controlled by said call processor, and
a line concentration group provided between a plurality of subscriber telephone sets and said exchange, said line concentration group including
  a line concentrator operatively connected to the subscriber telephone sets;
  a line processor, operatively connected to said line concentrator, controlling the line concentrator based on a call processing program,
  memory means for holding a boot program which can independently set signaling links with said exchange;
  signaling link setup means for setting up a signaling link based on the boot program in said memory means; and
  starting means for receiving the call processing program from said program holding unit through the signaling link set up by said signaling link setup means and for starting up said line processor.

6. An apparatus as set forth in claim 5, wherein said memory means is formed as a starting memory.

7. An apparatus as set forth in claim 6, wherein said starting memory is constituted by a programmable read only memory (ROM).

8. An apparatus as set forth in claim 6, wherein said line concentration group further includes:
  a signaling controller accommodating said starting memory and operatively connected to said line concentrator; and
  a common bus operatively connected to said signaling controller and said line processor.

9. An apparatus as set forth in claim 8, wherein said signalling controller includes:
  a signaling read only memory (ROM) providing the starting memory and holding the boot program,
  a central processing unit (CPU) operatively connected to said signaling ROM, and
  a random access memory (RAM) operatively connected to the CPU and holding data.

10. An apparatus as set forth in claim 9,
wherein said line processor further includes a main memory, and
wherein said signaling link setup means is constituted by said CPU, said signaling ROM, and said RAM, said signaling link setup means loading said boot program held in said starting memory through said common bus to said main memory in said line processor.

11. An apparatus as set forth in claim 10, wherein said starting means is constituted by said line processor and main memory.

12. An apparatus as set forth in claim 5, wherein said boot program executes one of a common channel signaling method based on Consultative Committee for International Telegraph and Telephone method number 7, a simplified common channel signaling method, and a packet communication method, held in said memory means.

13. An apparatus as set forth in claim 5, wherein said signaling link setup means sets up the signaling link to said program holding unit through said line concentrator, digital terminals, said switch module, a common signaling equipment interface, and common signaling equipment.

14. An apparatus for starting switching in a system having an exchange connected to a line concentration group, said apparatus comprising:
  program holding means at the exchange for holding a call processing program;
  switching means at the exchange for switching calls;
  call processing means at the exchange for processing calls by controlling the switching;
  line concentrating means at the line concentration group for concentrating lines;
  line processing means at the line concentration group for controlling the concentrating based on a call processing program;
  memory means at the line concentration group for storing a boot program;
  signaling link setup means at the line concentration group for setting up a signaling link with the exchange based on the boot program; and
  starting means at the line concentration group for receiving the held call processing program over the set up signaling link with the exchange based on the boot program.

15. An apparatus according to claim 14, wherein said signaling link setup means sets up the signaling link with the exchange based on the boot program according to a common channel signaling method.

16. An apparatus according to claim 15, wherein said common channel signaling method is based on the Consultative Committee for International Telegraph and Telephone method number 7.

17. An apparatus according to claim 14, wherein said signaling link setup means sets up the signaling link with the exchange based on the boot program according to a packet communication method.

18. A method of starting a line concentration group connected by signaling links to an exchange, said method including the steps of:
  (a) storing in the line concentration group a boot program which can independently set signaling links with the exchange;
  (b) setting up by control of the boot program a signaling link between the line concentration group and the exchange;
  (c) transferring through the signaling link from the exchange to the line concentration group a call processing program;
  (d) storing in the line concentration group the call processing program;
  (e) starting the line concentration group after storing the call processing program in the line concentration group; and
  (f) performing switching in the line concentration group to enable connection of calls between the line concentration group and the exchange.

* * * * *

UNITED STATES PATENT AND TRADEMARK OFFICE
CERTIFICATE OF CORRECTION

PATENT NO. : 5,001,740

DATED : March 19, 1991

INVENTOR(S) : Takano et al.

It is certified that error appears in the above-identified patent and that said Letters Patent is hereby corrected as shown below:

ON TITLE PAGE:[21] Appl. No.: "453,423" should be --452,423--;

[56] References Cited, line 3, "4,197,423" should be --4,197,427--.

Col. 1, line 23, "a" should be deleted.

Col. 2, line 6, "practical" should be deleted;
line 7, "the merits" should be --the practical merits--.

Signed and Sealed this

First Day of September, 1992

Attest:

DOUGLAS B. COMER

Attesting Officer

Acting Commissioner of Patents and Trademarks